United States Patent
Umlauf

(10) Patent No.: US 11,135,952 B2
(45) Date of Patent: Oct. 5, 2021

(54) COVER ADAPTABLE TO FOLDABLE VEHICLE SEATS

(71) Applicant: 4Knines, LLC, Vernon Hills, IL (US)

(72) Inventor: James Umlauf, Glendale, AZ (US)

(*) Notice: Subject to any disclaimer, the term of this patent is extended or adjusted under 35 U.S.C. 154(b) by 0 days.

(21) Appl. No.: 16/526,709

(22) Filed: Jul. 30, 2019

(65) Prior Publication Data

US 2019/0351797 A1 Nov. 21, 2019

Related U.S. Application Data

(63) Continuation of application No. 15/847,845, filed on Dec. 19, 2017, now Pat. No. 10,363,847, which is a continuation of application No. 15/650,438, filed on Jul. 14, 2017, now Pat. No. 9,845,033.

(51) Int. Cl.
*B60N 2/60* (2006.01)
*B60N 2/36* (2006.01)

(52) U.S. Cl.
CPC ............ *B60N 2/6018* (2013.01); *B60N 2/36* (2013.01); *B60N 2/6027* (2013.01); *B60N 2/60* (2013.01); *B60N 2002/363* (2013.01)

(58) Field of Classification Search
None
See application file for complete search history.

(56) References Cited

U.S. PATENT DOCUMENTS

| | | | | |
|---|---|---|---|---|
| 4,047,756 A | * | 9/1977 | Ney | B60N 2/58 |
| | | | | 297/219.1 |
| 4,487,451 A | * | 12/1984 | Fiorini | B60N 2/34 |
| | | | | 297/219.1 |
| 5,215,345 A | * | 6/1993 | Orphan | B60N 2/3013 |
| | | | | 296/37.16 |
| 5,322,335 A | * | 6/1994 | Niemi | B60N 2/6009 |
| | | | | 296/39.1 |
| 5,570,921 A | * | 11/1996 | Brooker | B60R 5/04 |
| | | | | 224/542 |
| 5,704,685 A | | 1/1998 | Handa | |
| 5,722,710 A | * | 3/1998 | Falciani | B60R 13/01 |
| | | | | 296/39.1 |
| 6,036,263 A | * | 3/2000 | Gold | A47D 15/006 |
| | | | | 297/219.12 |

(Continued)

FOREIGN PATENT DOCUMENTS

| | | | |
|---|---|---|---|
| JP | 05202642 A | * | 8/1993 |
| WO | WO009113576 | | 9/1991 |

OTHER PUBLICATIONS

"How to Install the ZipWall® Heavy Duty Zipper"—Jon-Don, YouTube Video (https://www.youtube.com/watch?v=D_5KTJnHYVA)—uploaded to YouTube Sep. 16, 2010—screenshot included within Office Action. (Year: 2010).*

*Primary Examiner* — David E Allred
(74) *Attorney, Agent, or Firm* — David R. Conklin; Kirton McConkie

(57) ABSTRACT

A seat cover for a vehicle may include a lower or bench portion sized and configured to extend over a horizontally-oriented top of a bench of a vehicle seat. The lower portion may include a first section and a second section separated by a slit. The seat cover for the vehicle may also include an upper or backrest portion coupled to the lower portion. The upper portion may be sized and configured to extend upwardly over a backrest of the vehicle seat.

16 Claims, 15 Drawing Sheets

(56) References Cited

U.S. PATENT DOCUMENTS

| | | | | |
|---|---|---|---|---|
| 6,644,709 B2* | 11/2003 | Inagaki | ................ | B60N 2/3013 |
| | | | | 296/37.14 |
| 6,702,381 B2* | 3/2004 | Endicott | .............. | A47D 15/006 |
| | | | | 297/219.12 |
| 6,752,457 B2* | 6/2004 | Gold | ................... | A47D 15/006 |
| | | | | 297/219.12 |
| 6,848,743 B1* | 2/2005 | Collins | ................ | B62B 3/1456 |
| | | | | 297/219.12 |
| 7,677,662 B2* | 3/2010 | Thompson | ............. | A47C 31/11 |
| | | | | 297/188.01 |
| 7,740,314 B2* | 6/2010 | Friedland | ................. | B60N 2/60 |
| | | | | 297/219.12 |
| 8,061,780 B2 | 11/2011 | Tsuji | | |
| 8,196,990 B2* | 6/2012 | Aebker | ................... | B60N 2/36 |
| | | | | 296/69 |
| 8,439,419 B2* | 5/2013 | Zuelch | .................... | B60N 2/36 |
| | | | | 296/65.16 |
| 8,505,999 B2* | 8/2013 | Whalen | ................... | B60N 2/36 |
| | | | | 296/65.09 |
| 8,657,373 B2* | 2/2014 | Miles | ...................... | B60N 2/60 |
| | | | | 297/228.1 |
| 9,545,886 B2* | 1/2017 | Ha | ........................ | B60R 13/011 |
| 9,669,742 B1* | 6/2017 | Bailey | ................. | B60N 2/5816 |
| 9,815,395 B2* | 11/2017 | Umlaut | .................... | B60N 2/90 |
| D807,275 S * | 1/2018 | Bennett | ........................ | D12/401 |
| 9,878,646 B2 | 1/2018 | Umlauf | | |
| 9,963,086 B2 | 5/2018 | Umlauf | | |
| 9,987,954 B2 | 6/2018 | Kimata | | |
| 10,227,051 B2* | 3/2019 | Koskey | ................ | B60R 13/011 |
| 10,960,798 B1* | 3/2021 | Li | .......................... | B60N 2/757 |
| 2016/0355108 A1* | 12/2016 | Kimata | .................... | B60N 2/12 |
| 2017/0253157 A1* | 9/2017 | Nagasawa | ................ | B60N 2/60 |

* cited by examiner

COVER ADAPTABLE TO FOLDABLE VEHICLE SEATS

RELATED APPLICATIONS

This Application is a continuation of U.S. patent application Ser. No. 15/847,845, filed Dec. 19, 2017, which is a continuation of Ser. No. 15/650,438, filed Jul. 14, 2017, which has now issued as U.S. Pat. No. 9,845,033, each of which is incorporated herein by reference, in their entirety.

BACKGROUND OF THE INVENTION

A vehicle seat may include a backrest, which may include one or more upper sections, and a bench, which may include one or more lower sections. The vehicle seat may be designed to move between various configurations in order to, for example, allow items of various sizes to be transported in the vehicle. In some instances, one or more of the upper sections may be folded up and one or more other upper sections may be folded down. In some instances, one or more lower sections may be folded up while one or more other lower sections are folded down.

A cover for a vehicle seat and/or a cargo bed may be limited to a particular type of car, with particular dimensions and features, or a particular seat configuration. In some cases, the cover may not permit movement of the vehicle seat between the various configurations or may cover various features, such as seat belts. In order to perform a particular function in the vehicle, the cover may need to be removed. Further, vehicle seats may be exposed to various events that may damage the vehicle seats due to, for example, pets, children, spills, objects, etc.

BRIEF SUMMARY OF THE INVENTION

The present invention relates to a cover for an interior of a vehicle. In particular, the present invention relates to a cover adaptable to multiple vehicle seat configurations. In some embodiments, the cover for the vehicle may include a seat cover. In some embodiments, the cover may include a lower portion, which may be sized and configured to extend over a horizontally-oriented top of a bench of a vehicle seat.

In some embodiments, the lower portion may include multiple sections. In some embodiments, the lower portion may include a first section and a second section, which may be separated by a slit. In some embodiments, the slit may be configured to allow the first section to be disposed in an upward position and the second section to be disposed in a downward position when the bench is disposed in a first configuration. In some embodiments, the slit may be configured to allow the first section to be disposed in a downward position and the second section to be disposed in an upward position when the bench is disposed in a second configuration.

In some embodiments, the cover may also include an upper portion coupled to the lower portion. In some embodiments, the upper portion may be sized and configured to extend upwardly over a backrest of the vehicle seat. In some embodiments, the first section of the lower portion may extend from a lower edge of the upper portion to a front edge of the lower portion and/or the second section of the lower portion may extend from the lower edge of the upper portion to the front edge of the lower portion.

In some embodiments, the cover may include a coupling mechanism, which may be configured to selectively couple the first section to the second section. In some embodiments, the coupling mechanism may include a hook, a button, a zipper, a snap, a magnet, a clasp, an eyelet, a hook, a hook and loop fastener, such as VELCRO™, or another suitable coupling mechanism. In some embodiments, an underside of the lower portion may include a pocket configured to be secured around a portion of the bench.

In some embodiments, the lower portion may include a third section, which may be separated from the second section of the lower portion by another slit. In some embodiments, the third section may extend from the lower edge of the upper portion to the front edge of the lower portion. In some embodiments, the cover may include another coupling mechanism, which may be configured to selectively couple the second section of the lower portion to the third section of the lower portion. In some embodiments, the other coupling mechanism may include a hook, a button, a zipper, a snap, a magnet, a clasp, an eyelet, a hook, a hook and loop fastener, such as VELCRO™, or another suitable coupling mechanism.

In some embodiments, the cover may include a guard portion, which may be coupled to the front edge of the lower portion. In some embodiments, the slit and/or the other slit may extend through the guard portion. In some embodiments, the lower portion may be disposed between the upper portion and the guard portion.

In some embodiments, widths of the first section of the lower portion, the second section of the lower portion, and the third portion of the lower portion may vary depending on, for example, a particular seat configuration and dimensions of the vehicle. For example, a width of the first section of the lower portion may be approximately 20% of a total width of the seat cover, a width of the second section of the lower portion may be approximately 40% percent of the total width of the seat cover, and a width of the third section of the lower portion may be approximately 20% of the total width of the seat cover. As another example, the width of the first section may be approximately half of the total width of the seat cover, and a width of the second section may be approximately half of the total width of the seat cover. As a further example, a width of the first section may be approximately 40% of the total width of the seat cover, and a width of the second section may be approximately 60% of the total width of the seat cover. Further still, a first group of one or more sections of the seat cover may comprise a combined width of approximately 20%, 40%, or 50% of the total width of the seat cover, and a second group of one or more sections of the seat cover may comprise a combined width of approximately 20%, 40%, 50%, or 60% of the total width of the seat cover.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE INVENTION

The presently preferred embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Figure 1:
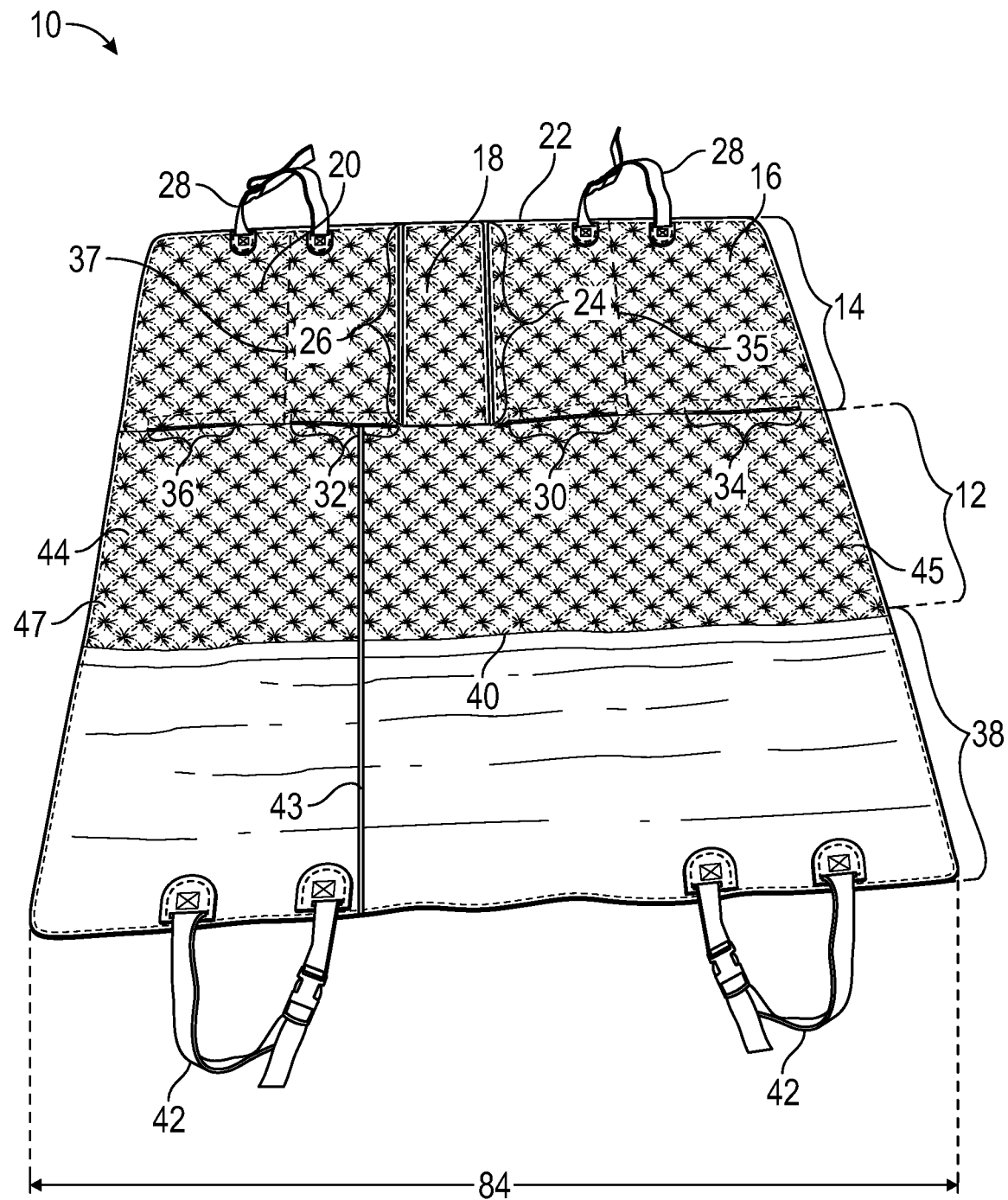
FIG. 1 is a top view of an example cover, according to some embodiments.

Referring now to FIG. 1, in some embodiments, the cover 10 for the vehicle may include a seat cover. In some embodiments, the cover 10 may include a lower portion 12, which also may be described as a bench portion. In some embodiments, the cover 10 may also include an upper portion 14 coupled to the lower portion 12, wherein the upper portion 14 may also be described as a backrest portion.

In some embodiments, the upper portion 14 may include one or more sections. For example, the upper portion 14 may include one or more of the following: a first section 16, a second section 18, and a third section 20. In some embodiments, one or more of the following may extend from an upper edge 22 of the upper portion 14 to the lower portion 12 or to a position proximate to the lower portion 12: the first section 16, the second section 18, and the third section 20. In some embodiments, the sections of the upper portion 14 may be separated by one or more slits. For example, the first and second sections 16, 18 may be separated by a first slit 24 and/or the second and third sections 18, 20 may be separated by a second slit 26.

In some embodiments, the slits of the upper portion 14 may be at least partially closed via one or more coupling mechanisms. In some embodiments, the cover 10 may include a first coupling mechanism, which may be configured to directly couple the first section 16 and the second section 18. In some embodiments, the first coupling mechanism may be configured to at least partially close the first slit 24, which may extend from the upper edge 22 to the lower portion 12. In some embodiments, the cover 10 may include a second coupling mechanism, which may be configured to directly couple the second section 18 and the third section 20. In some embodiments, the second coupling mechanism may be configured to at least partially close the second slit 26, which may extend from the upper edge 22 to the lower portion 12, or to a position proximate to lower portion 12.

In some embodiments, the upper portion 14 may include one or more fasteners 28 configured to secure the cover 10 to the seat. In some embodiments, one or more of the following may include at least one fastener 28: an upper portion of the first section 16, an upper portion of the second section 18, and an upper portion of the third section 20. In some embodiments, the fasteners 28 may be configured to secure the cover 10 to one or more headrests of the vehicle. In some embodiments, the upper portion of the first section 16 and the upper portion of the third section 20 may include a fastener 28. Each of the fasteners 28 may include any suitable means of securing the cover 10 to the seat. For example, as illustrated in FIG. 1, each of the fasteners 28 may include a belt, which may be configured to form a loop around the headrest. In some embodiments, the loop may include a clasp.

In some embodiments, the cover 10 may include one or more openings disposed between the upper portion 14 and the lower portion 12. In some embodiments, the one or more openings may include one or more of the following: a first opening 30, a second opening 32, a third opening 34, and a fourth opening 36. In some embodiments, one or more of the first opening 30, the second opening 32, the third opening 34, and the fourth opening 36 may include a generally horizontal slit. In some embodiments, the first opening 30 may extend along a portion of a lower edge of the first section 16 to at least the second section 18. In some embodiments, the first opening 30 may extend along the portion of the lower edge of the first section to the third section 20. In these embodiments, in response to the first section 16 being uncoupled from the second section 18 via the first coupling mechanism and the third section 20 being uncoupled from the second section 18 via the second coupling mechanism, the second section 18 may be detached or removed from the cover 10.

In some embodiments, the second opening 32 may extend along a portion of a lower edge of the third section 20 to at least the second section 18. In some embodiments, the second opening 32 may extend along the portion of the lower edge of the third section 20 to the first section 16. In these embodiments, in response to the third section 20 being uncoupled from the second section 18 via the second coupling mechanism and the first section 16 being uncoupled from the second section 18 via the first coupling mechanism, the second section 18 may be detached or removed from the cover 10. In some embodiments, the first section 16 may be folded over fold line 35 and/or the third section 20 may be folded over fold line 37.

In some embodiments, the third opening 34 may be disposed between the first section 16 and the lower portion 12. In some embodiments, the fourth opening 36 may be disposed between the third section 20 and the lower portion 12. In some embodiments, one or more of the first opening 34, the second opening 32, the third opening 34, and the fourth opening 36 may be configured to receive a seat belt and/or a fastener used to anchor a child car seat.

In some embodiments, the cover 10 may be constructed of a fabric material, such as, for example, one or more of the following: spandex knit, lycra knit, jersey knit, interlock knit, ribbed knit, terry knit, sweater knit, modal knit, hemp knit, bamboo knit, silk knit, cotton knit, ponte de roma, thermal knit, stretch lace, synthetic knit, organic knit, polyvinyl chloride, cotton, nylon, polyester, etc. In some embodiments, the fabric material may be stretchable. In some embodiments, the fabric material may be weatherproof and/or machine-washable.

In some embodiments, the cover 10 may include a guard portion 38, which may be coupled to a lower edge 40 of the lower portion 12. In some embodiments, the guard portion 28 may be selectively coupled to the lower edge 40. In some embodiments, when the cover 10 is used as the seat cover, the guard portion 38 may be configured to extend vertically and/or generally perpendicularly from the lower portion 12. In some embodiments, the guard portion 38 may include one or more fasteners 42, which may be configured to secure the cover 10 to the seat of the vehicle. Each of the fasteners 42 may include any suitable means of securing the cover 10 to the seat. For example, as illustrated in FIG. 1, each of the fasteners 42 may include a belt, which may be configured to form a loop around a portion of the seat, such as a leg. In some embodiments, the loop may include a clasp.

In some embodiments, the cover 10 may be configured to hang similar to a hammock between one or more headrests disposed on front seats of the vehicle and one or more headrests disposed on back seats of the vehicle. For example, each of the fasteners 28 may be coupled with the head rests disposed on the front seats of the vehicle and each of the fasteners 42 may be coupled with the head rests disposed on the back seats of the vehicle. In these embodiments, the lower portion 12 may hang lower than the upper portion 14 and/or the guard portion 38.

In some embodiments, the lower portion 12 may include one or more sections. In some embodiments, the sections of the lower portion 12 may be separated by one or more slits 43. In some embodiments, the slits 43 may extend through the lower portion 12 and/or the guard portion 38. FIG. 1 illustrates a particular lower portion 12 that includes a first section 45 and a second section 47 separated by a particular slit 43 that extends through the lower portion 12 and the guard portion 38.

In some embodiments, the slits 43 may be at least partially closed via one or more coupling mechanisms. In some embodiments, the coupling mechanisms may each include any suitable coupling mechanism, such as for example, zippers, buttons, snaps, magnets, clasps, eyelets, hooks, a hook and loop fastener, such as VELCRO™, etc. In some embodiments, a particular slit 43 may be aligned with the first slit 24, the second slit 26, or another slit of the upper portion 14. As illustrated in FIG. 1, in some embodiments, a particular slit 43 may not be aligned with the first slit 24, the second slit 26, or another slit of the upper portion 14. In some embodiments, alignment between the slits 43 and the first slit 24, the second slit 26, or another slit of the upper portion 14 may be dependent on a configuration of the bench and the backrest of the vehicle seat.

In some embodiments, the vehicle seat may include a backrest, which may include one or more upper sections, and a bench, which may include one or more lower sections. The vehicle seat may be designed to move between various configurations in order to, for example, allow items of various sizes to be transported in the vehicle. In some embodiments, one or more upper sections of the backrest may be folded up and/or one or more other upper sections of the backrest may be folded down. In these and other embodiments, one or more lower sections of the bench may be folded up and/or one or more other lower sections of the bench may be folded down. In some embodiments, the slits 43 may facilitate folding up of one or more of the lower sections of the bench of the vehicle seat.

Figure 2:
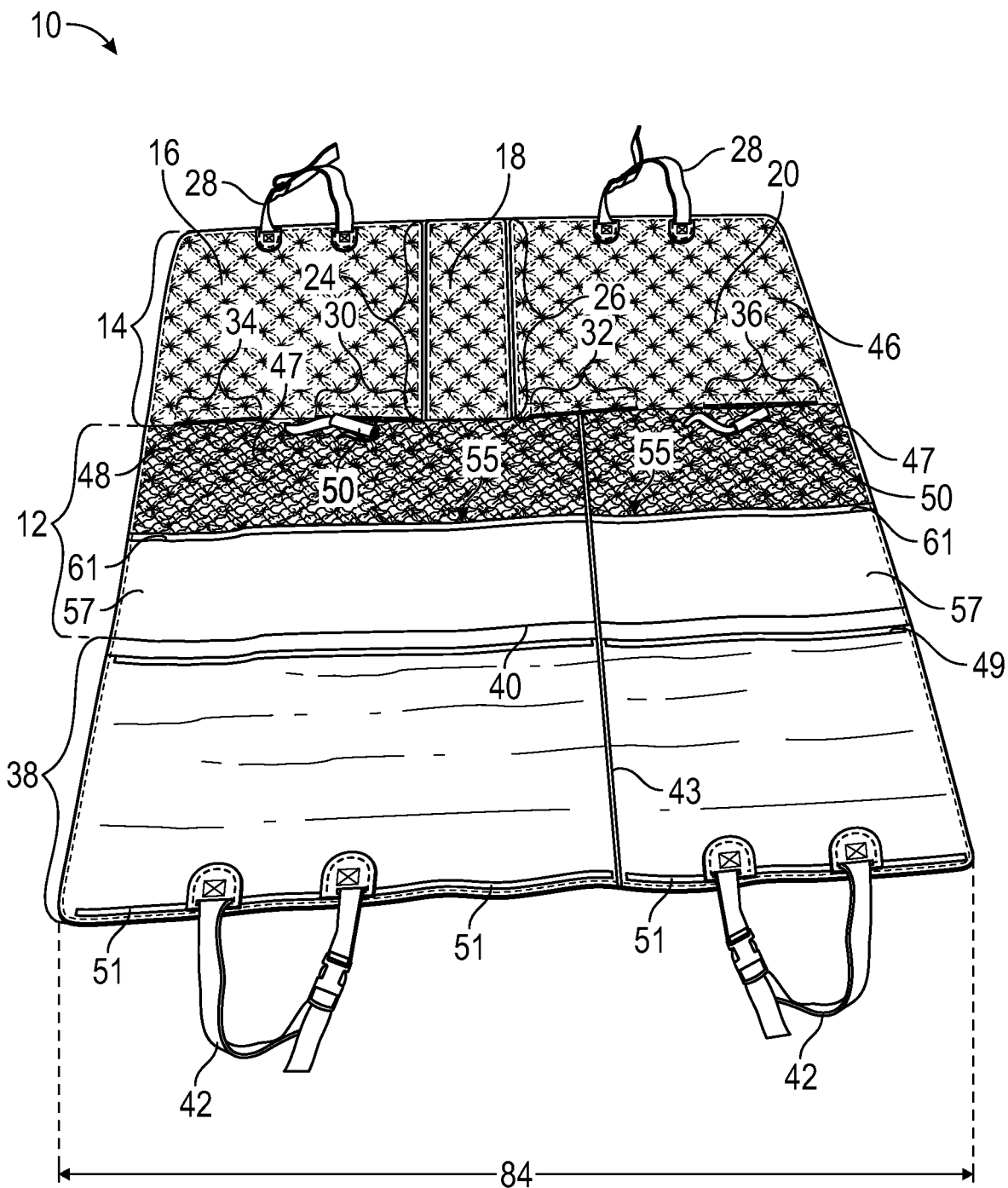
FIG. 2 is a bottom view of the example cover of FIG. 1, according to some embodiments.

Referring now to FIGS. 1 and 2, in some embodiments, the cover 10 may include a first layer 44 of the fabric material and a second layer 46 of the fabric material, which may be sewn together. In some embodiments, padding may be disposed between at least a portion of the first and second layers 38, 40 of the fabric material. In some embodiments, the guard portion 38 may or may not include the padding. In some embodiments, the guard portion 38 may include a single layer of the fabric material.

Referring now to FIG. 2, in some embodiments, the cover 10 may include another layer or backing layer 48, which may be disposed on at least a portion of an underside of the cover 10. For example, the backing layer 48 may be disposed on an underside of the lower portion 12 and/or the upper portion 14. In some embodiments, the cover 10 may be used as a cargo bed cover, an example of which is described in U.S. Pat. No. 9,610,877, filed Jul. 20, 2016, entitled "Cover Adaptable to Multiple Vehicle Seat Configurations," which is herein incorporated by reference in its entirety. In some embodiments, when the cover 10 is used as a cargo bed cover, for example, the backing layer 48 may be disposed on an underside of the lower and upper portions 12, 14.

In some embodiments, when the cover 10 is used as the seat cover, the backing layer 48 may be disposed on the underside of the lower portion 12. In some embodiments, the backing layer 48 may be configured to prevent slippage and/or increase friction between the cover 10 and the seat and/or the cargo bed. In some embodiments, the backing layer 48 may include a netting. In some embodiments, the backing layer 48 may be constructed of rubber, plastic, or another suitable material that allows the cover 10 to be flexible and/or foldable. In some embodiments, the cover 10 may include a water-proof coating. In some embodiments, one or more anchors 50 may be coupled to the underside of the cover 10. In some embodiments, the anchors 50 may be configured to be tucked into a crease in the seat between the backrest and the bench of the seat. In some embodiments, the anchors 50 may be loop-shaped.

In some embodiments, one or more of the following may extend along substantially all of a height of the upper portion 14: the first slit 24, the second slit 26, the first coupling mechanism, and the second coupling mechanism. In some embodiments, the upper portion 14 may include any number of slits and/or coupling mechanisms that may extend along substantially all of the height of the upper portion 14.

Figure 4:
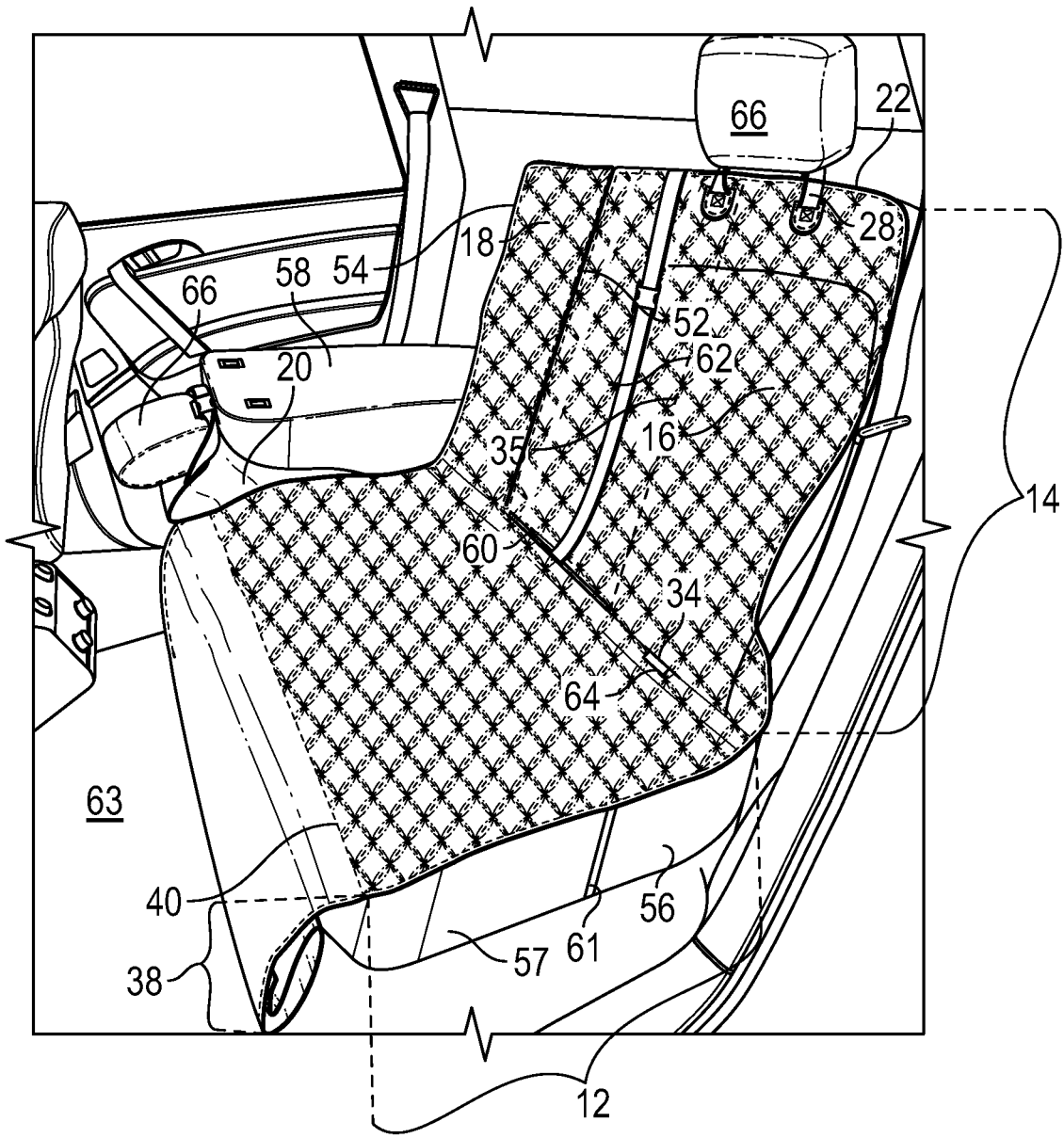
FIG. 4 is an upper perspective view of the cover of FIG. 1, illustrating the cover extending over a bench and backrest of a vehicle seat in one configuration, according to some embodiments.
Figure 5:
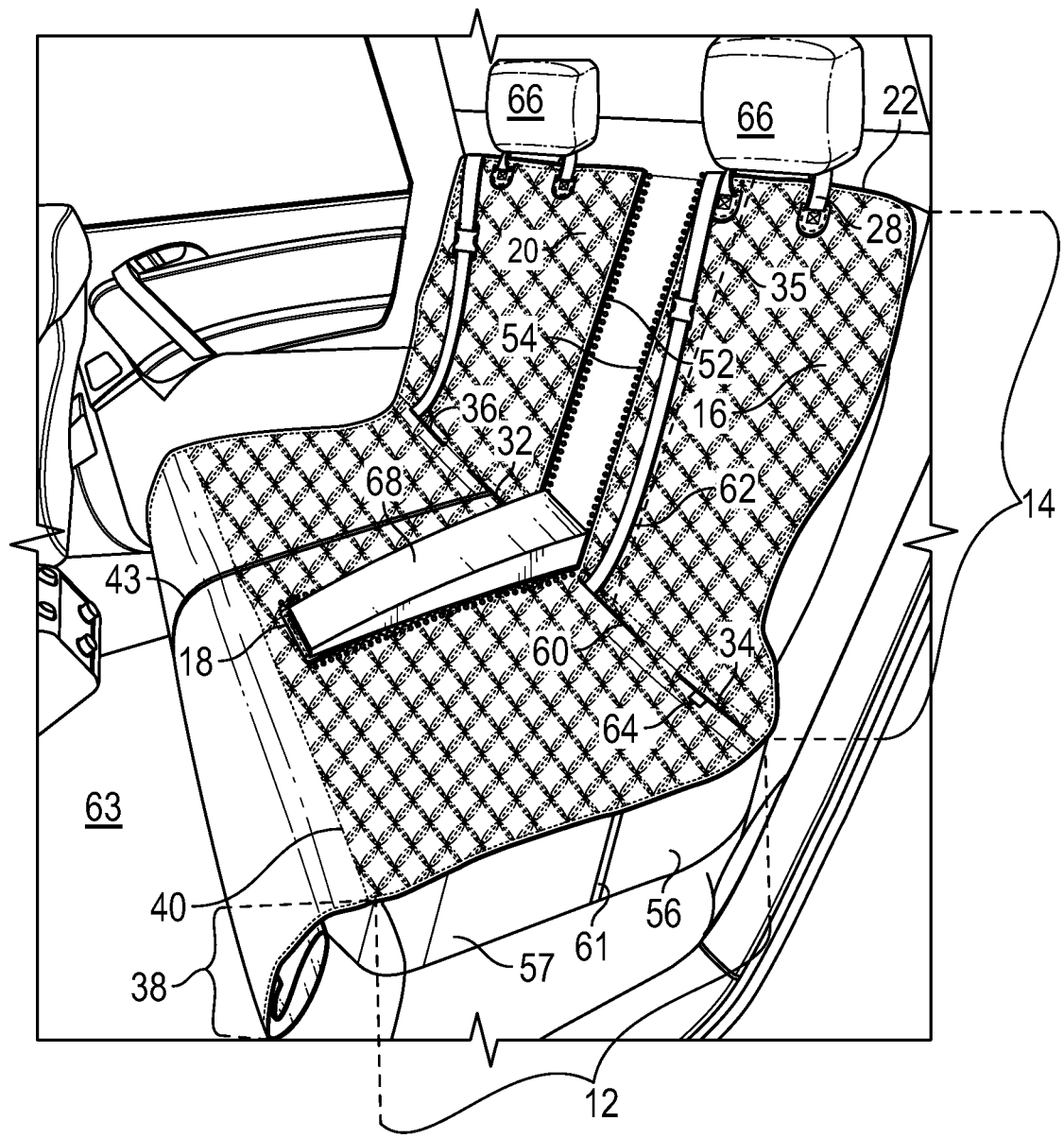
FIG. 5 is an upper perspective view of the cover of FIG. 1, illustrating the cover extending over the bench and the backrest of the vehicle seat in another configuration, according to some embodiments.
Figure 6:
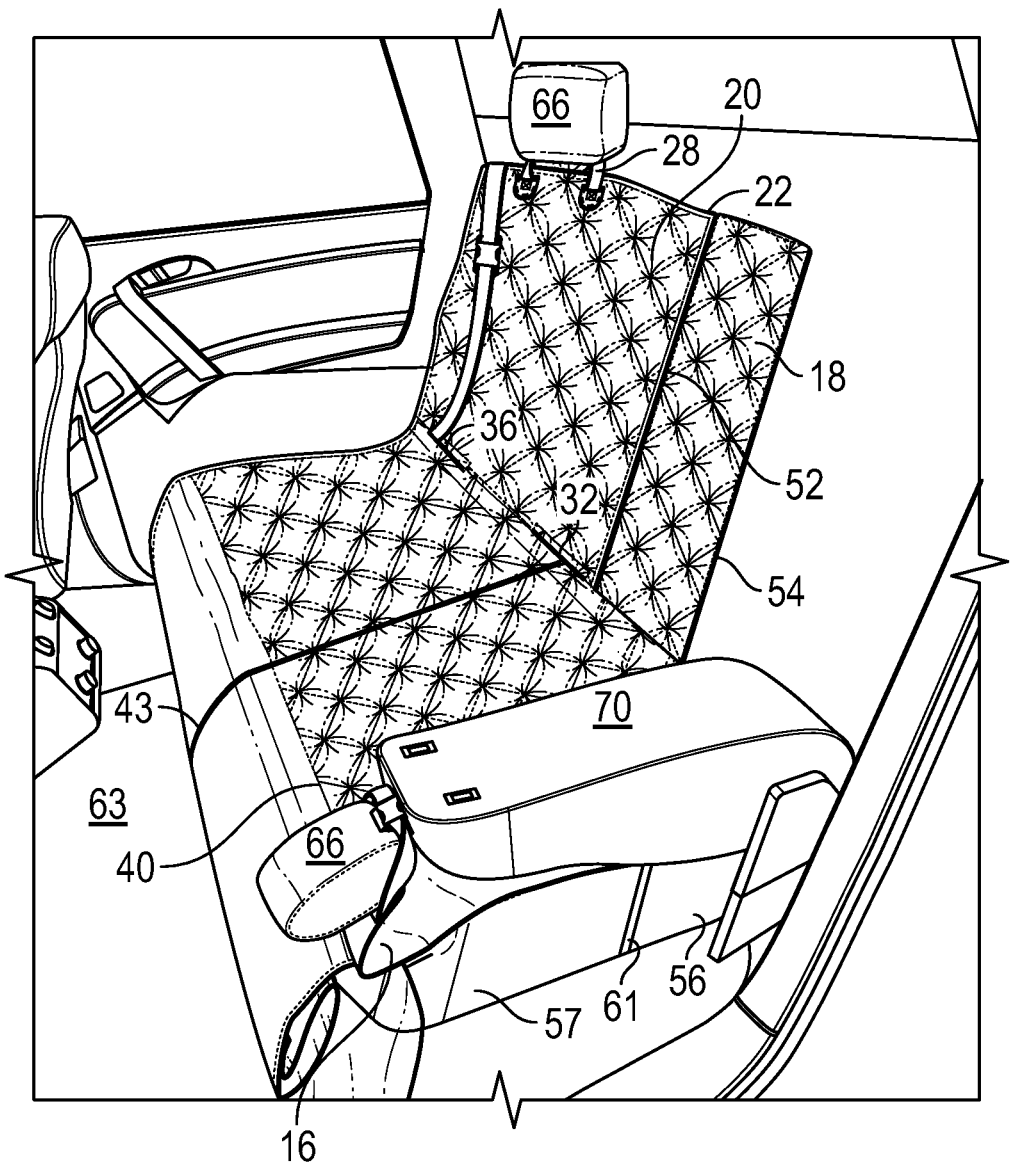
FIG. 6 is an upper perspective view of the cover of FIG. 1, illustrating the cover extending over the bench and the backrest of the vehicle seat in another configuration, according to some embodiments.

In some embodiments, the guard portion 38 may include or more guard coupling mechanisms, which may facilitate rolling or folding of the guard portion 38. For example, one or more first guard coupling mechanisms 49 may be disposed towards or proximate the lower portion 12 and one or more second guard coupling mechanisms 51 may be disposed towards or proximate an end or lower edge of the guard portion 38 such that the guard portion 38 may be folded as illustrated, for example, in FIGS. 4-6. In some embodiments, the one or more guard coupling mechanisms 49, 51 may be disposed on a bottom or underside of the guard portion 38. In some embodiments, the cover 10 may not include the guard portion 38. A floor 63 of the vehicle is also illustrated in FIGS. 4-6, according to some embodiments.

The guard coupling mechanisms 49, 51 illustrated in FIG. 2 are hook and loop fasteners. However, the guard coupling mechanisms 49, 51 may each include any suitable coupling mechanisms, such as for example, buttons, snaps, magnets, clasps, eyelets, hooks, etc. Guard coupling mechanisms may be disposed at any number of locations on the guard portion 38 to facilitate rolling or folding of the guard portion.

In some embodiments, the underside of the lower portion 12 may include one or more pockets or pouches 57 configured to hold one or more of the lower sections of the bench of the vehicle seat, as will be explained later in further detail. In some embodiments, edges of the pockets may be coupled with the lower portion 12. For example, the edges of the pockets may be coupled to the backing layer 48. In some embodiments, the edges of the pockets may be coupled to the lower portion 12 via sewing or another suitable method. In some embodiments, the pouches 57 may include an elastic material, such as, for example, an elastic band 61, which may facilitate a secure fit of the pouches 57 around one or more of the lower sections of the bench disposed within openings 55 of the pouches 57.

In some embodiments, a particular coupling mechanism may extend along at least a portion of a particular slit disposed in the upper portion 14. For example, referring now to FIG. 3, the first coupling mechanism 52 may extend along at least a portion of the first slit 24 and/or the second coupling mechanism 54 may extend along at least a portion of the second slit 26. The first and second coupling mechanisms 52, 54 may each include any suitable coupling mechanisms, such as for example, buttons, snaps, magnets, clasps, eyelets, hooks, a hook and loop fastener, etc. In some embodiments, the first and second coupling mechanisms 52, 54 may include zippers, as illustrated in FIG. 3.

In some embodiments, a third coupling mechanism 60 may be configured to at least partially close the first opening 30. In some embodiments, a fourth coupling mechanism 59 may be configured to at least partially close the second opening 32. In some embodiments, the third coupling mechanism 60 may extend along at least a portion of the first opening 30. In some embodiments, the fourth coupling mechanism 59 may extend along at least a portion of the second opening 32. In some embodiments, the third coupling mechanism 60 and/or the fourth coupling mechanism 59 may each include any suitable coupling mechanisms, such as for example, buttons, snaps, magnets, clasps, etc. In some embodiments, the third coupling mechanism 60 and/or the fourth coupling mechanism may be disposed in a crease or seam between the lower portion 12 and the upper portion 14.

Figure 3:
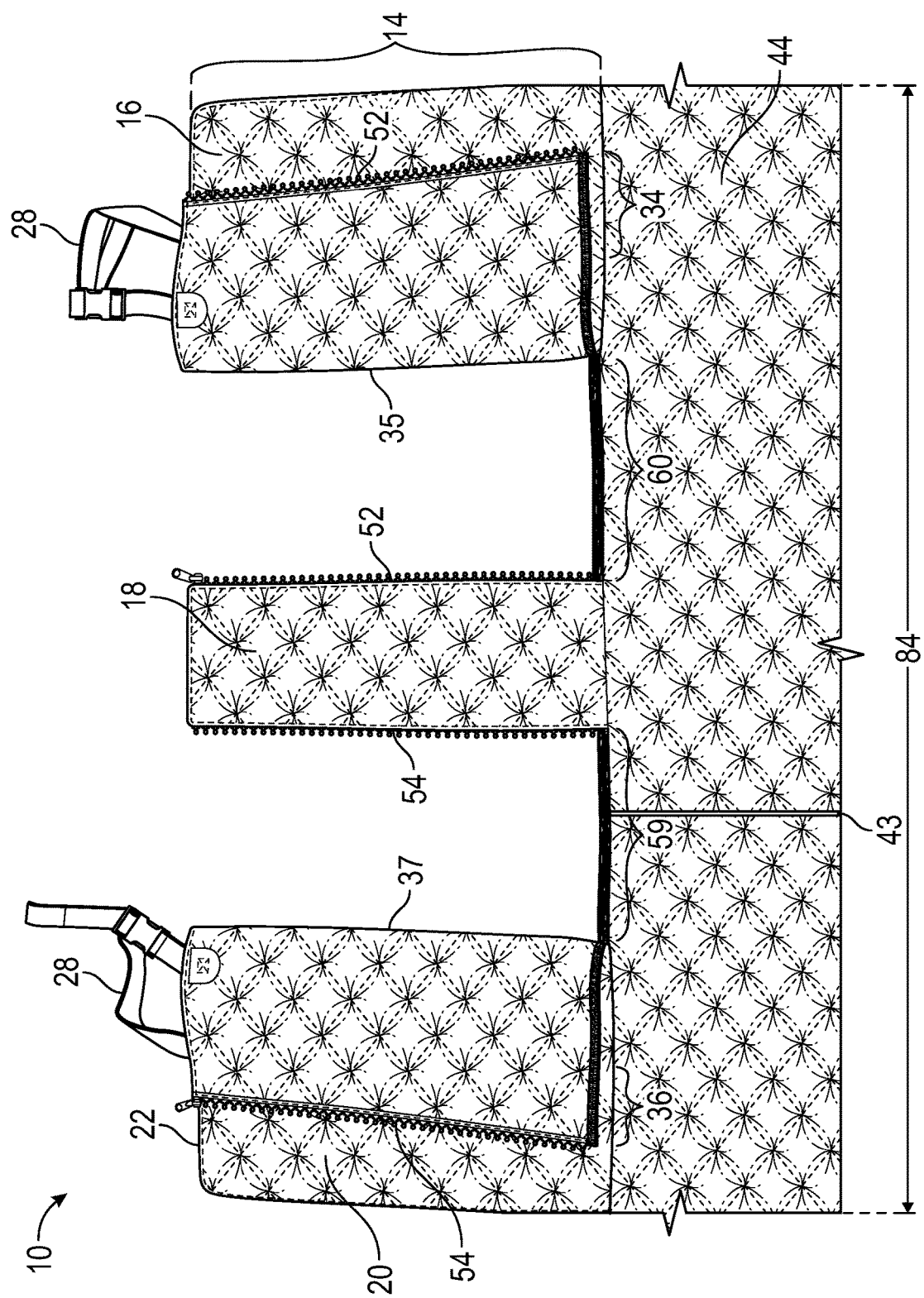
FIG. 3 is a top view of a portion of the example cover of FIG. 1, illustrating a first section and a third section of an upper portion of the cover uncoupled from a second portion of the upper portion via the first and second coupling mechanisms, according to some embodiments.

In some embodiments, the third coupling mechanism 60 and/or the fourth coupling mechanism 59 may include a hook and loop fastener, as illustrated in FIG. 3, which may allow the first opening 30 and/or the second opening 32 to partially open to access a seatbelt. Coupling mechanisms the same as or similar to the first coupling mechanism 52, the second coupling mechanism 54, the third coupling mechanism 60, or the fourth coupling mechanism 59, may be used to close or partially close the third opening 34 and/or the fourth opening 36. In some embodiments, one or more of the following may be eliminated: the first coupling mechanism 52, the second coupling mechanism 54, the third coupling mechanism 60, and the fourth coupling mechanism 59. In some embodiments, the cover 10 may not include one or more of the following: the first coupling mechanism 52, the second coupling mechanism 54, the third coupling mechanism 59, and the fourth coupling mechanism 60.

Referring now to FIGS. 4-6, in some embodiments, the lower portion 12 may be sized and configured to extend over a horizontally-oriented top of the bench 56 of a vehicle seat. In some embodiments, a third upper section 58 of the backrest may be configured to be folded on top of the lower portion 12 independently of the first and second sections 16, 18 in response to the third section 20 being uncoupled from the second section 18 via the second coupling mechanism 54. In some embodiments, when the cover 10 is used as the seat cover, the third section 20 may be configured to be folded on top of the lower portion 12 independently of the first and second sections 16, 18 in response to the third section 20 being uncoupled from the second section 18 via the second coupling mechanism 54 and/or the third upper section 58 of the backrest being moved to a folded position.

In some embodiments, the third coupling mechanism 60 may be configured to at least partially close the first opening 30. In some embodiments, as illustrated in FIG. 4, the third coupling mechanism 60 may be configured to partially close the first opening 30 such that a seat belt 62 may extend through the first opening 30. In some embodiments, the fourth coupling mechanism 59 may be configured the same as or similar to the third coupling mechanism 60.

In some embodiments, a fastener 64 may be configured to, for example, anchor a child car seat and may extend through the third opening 34 and/or the fourth opening 36. In some embodiments, each of the fasteners 28 may be configured to secure the cover 10 to a headrest 66 of the vehicle. In some embodiments, the slits may be generally vertical or upright when the cover 10 is secured to and covers the vehicle seat, as illustrated, for example, in FIG. 4.

As illustrated in FIG. 5, in some embodiments, the second section 18 may be configured to be folded on top of the lower portion 12 independently of the first and third sections 16, 20 in response to the first section 16 being uncoupled from the second section 18 via the first coupling mechanism 52 and the third section 20 being uncoupled from the second section 18 via the second coupling mechanism 54. In some embodiments, when the cover 10 is used as the seat cover, the second section 18 may be configured to be folded on top of the lower portion 12 independently of the first and third sections 16, 20 in response to the first section 16 being uncoupled from the second section 18 via the first coupling mechanism 52 and the third section 54 being uncoupled from the second section 18 via the second coupling mechanism 54, and further in response to a second upper section 68 of the backrest being moved to a folded position, as illustrated in FIG. 5. In some embodiments, the second upper section 68 of the backrest may correspond to an arm rest or a person location.

As illustrated in FIG. 6, in some embodiments, the first section 16 may be configured to be folded on top of the lower portion 12 independently of the second and third sections 18, 20 in response to the first section 16 being uncoupled from the second section 18 via the first coupling mechanism 52. In some embodiments, when the cover 10 is used as the seat cover, the first section 16 may be configured to be folded on top of the lower portion 12 independently of the second and third sections 18, 20 in response to the first section 16 being uncoupled from the second section 18 via the first coupling mechanism 52 and/or a first upper section 70 of the backrest being moved to a folded position.

Figure 7A:
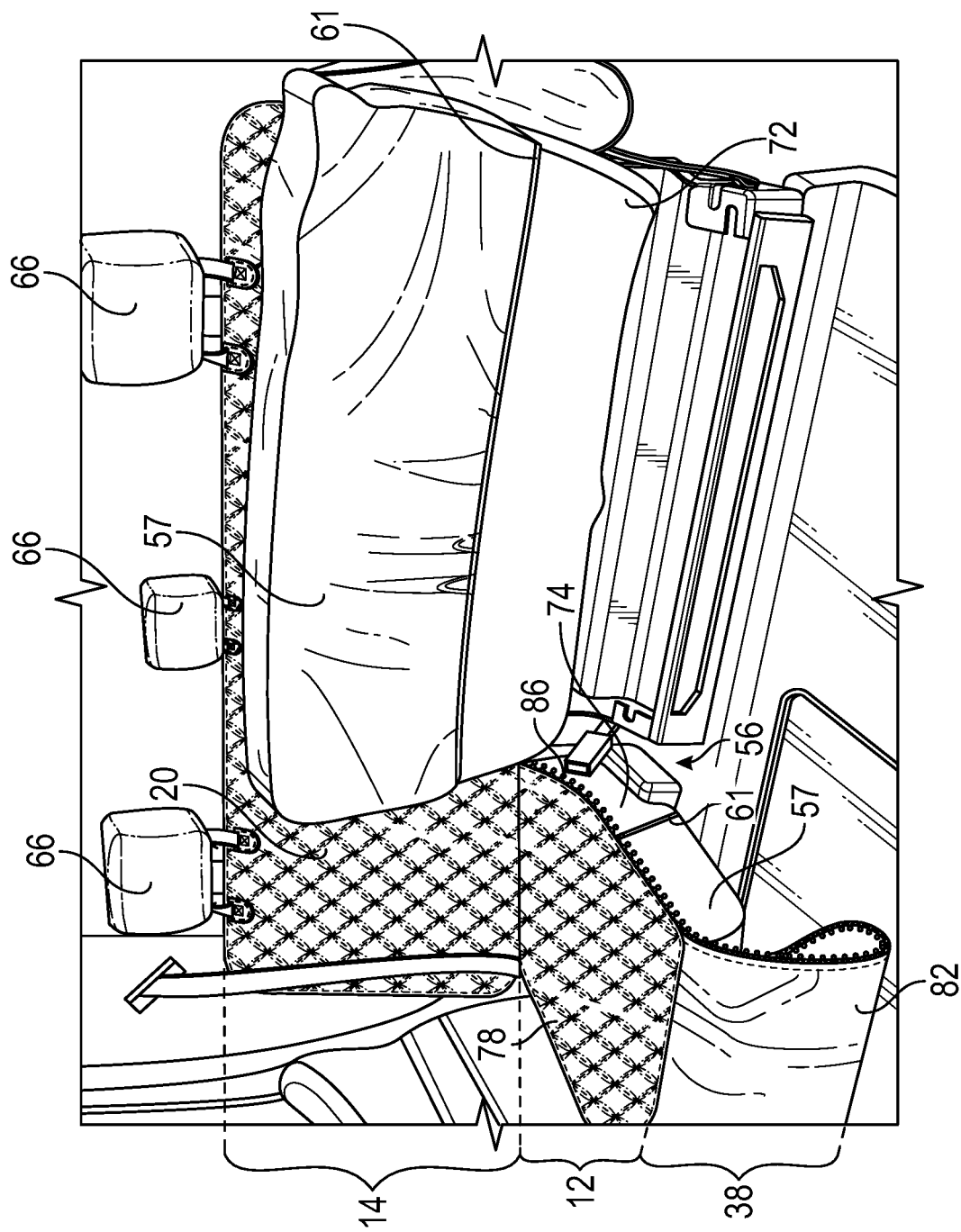
FIG. 7A is an upper perspective view of the cover of FIG. 1, illustrating the cover extending over the bench and the backrest of the vehicle seat in another configuration, according to some embodiments.
Figure 7B:
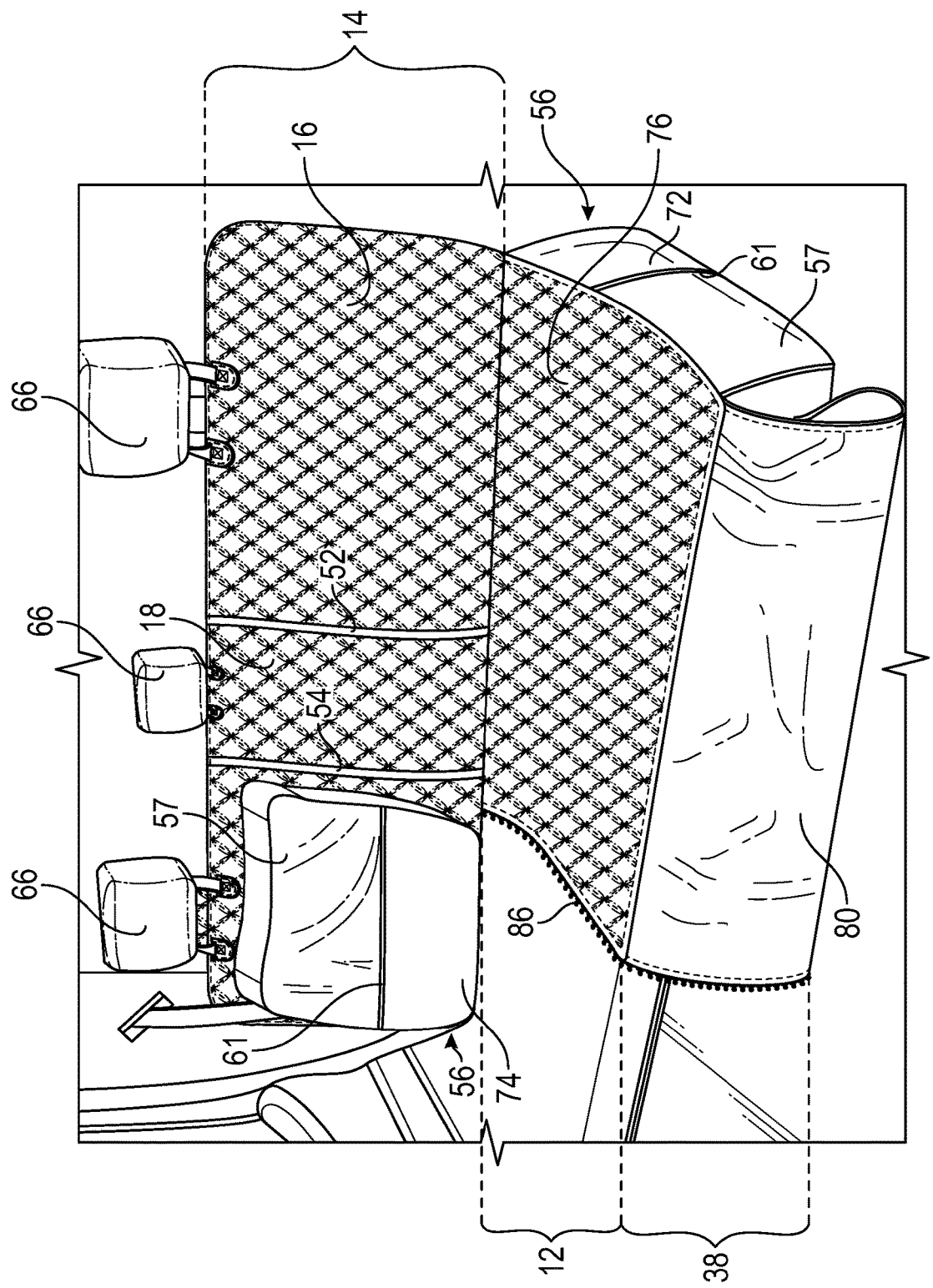
FIG. 7B is an upper perspective view of the cover of FIG. 1, illustrating the cover extending over the bench and the backrest of the vehicle seat in another configuration, according to some embodiments.

Referring now to FIGS. 7A-7B, in some embodiments, the bench 56 of the vehicle seat may include multiple lower sections. In some embodiments, the bench 56 may include two, three, four, five, or more lower sections, and the lower portion 12 may include a corresponding section for each lower section of the bench 56. For example, as illustrated in FIG. 7A-7B, the bench 56 may include a first lower section 72 and a second lower section 74. In some embodiments, the lower sections of the bench 56 may be configured to move upwardly and/or to generally vertical storage positions in order to, for example, allow items of various sizes to be transported in the vehicle. In further detail, in some embodiments, one or more lower sections may be folded up when one or more other lower sections are folded down. As illustrated in FIG. 7A, in some embodiments, the first section 72 may be folded up when the second section 74 is folded down. As illustrated in FIG. 7B, in some embodiments, the first section 72 may be folded down when the second section 74 is folded up.

In some embodiments, the one or more slits 43 of the lower portion 12 may facilitate folding up of one or more of the lower sections of the bench 56 of the vehicle seat. In some embodiments, the slits 43 may divide the lower portion 12 and/or the guard portion 38 into multiple sections. For example, as illustrated in FIGS. 7A-7B, the slit 43 may divide the lower portion 12 into a first section 76 and a second section 78. Additionally, in some embodiments, the slit 43 may divide the guard portion into a first section 80 and a second section 82.

In some embodiments, the slits 43 of the lower portion 12 may each include one or more coupling mechanisms 86 that may extend along at least a portion of the corresponding slit 43. In some embodiments, the slits 43 of the lower portion 12 may be at least partially closed via the coupling mechanisms 86. In some embodiments, the one or more coupling mechanisms 86 may include any suitable coupling mechanisms, such as for example, buttons, snaps, magnets, clasps, eyelets, hooks, a hook and loop fastener, etc. In some embodiments, the coupling mechanisms 86 may include zippers, as illustrated, for example, in FIGS. 7A-7B.

The lower portion 12 may include any number of slits 43, and thus, sections. In some embodiments, the number of slits 43 may be one less than a number of lower sections of the bench 56. In some embodiments, the slits 43 may extend from the upper portion 14 entirely through the lower portion 12 and/or the guard portion 38. In some embodiments, the slits 43 may extend from a position proximate to the upper portion 14 entirely through the lower portion 12 and/or the guard portion 38.

Figure 8A:
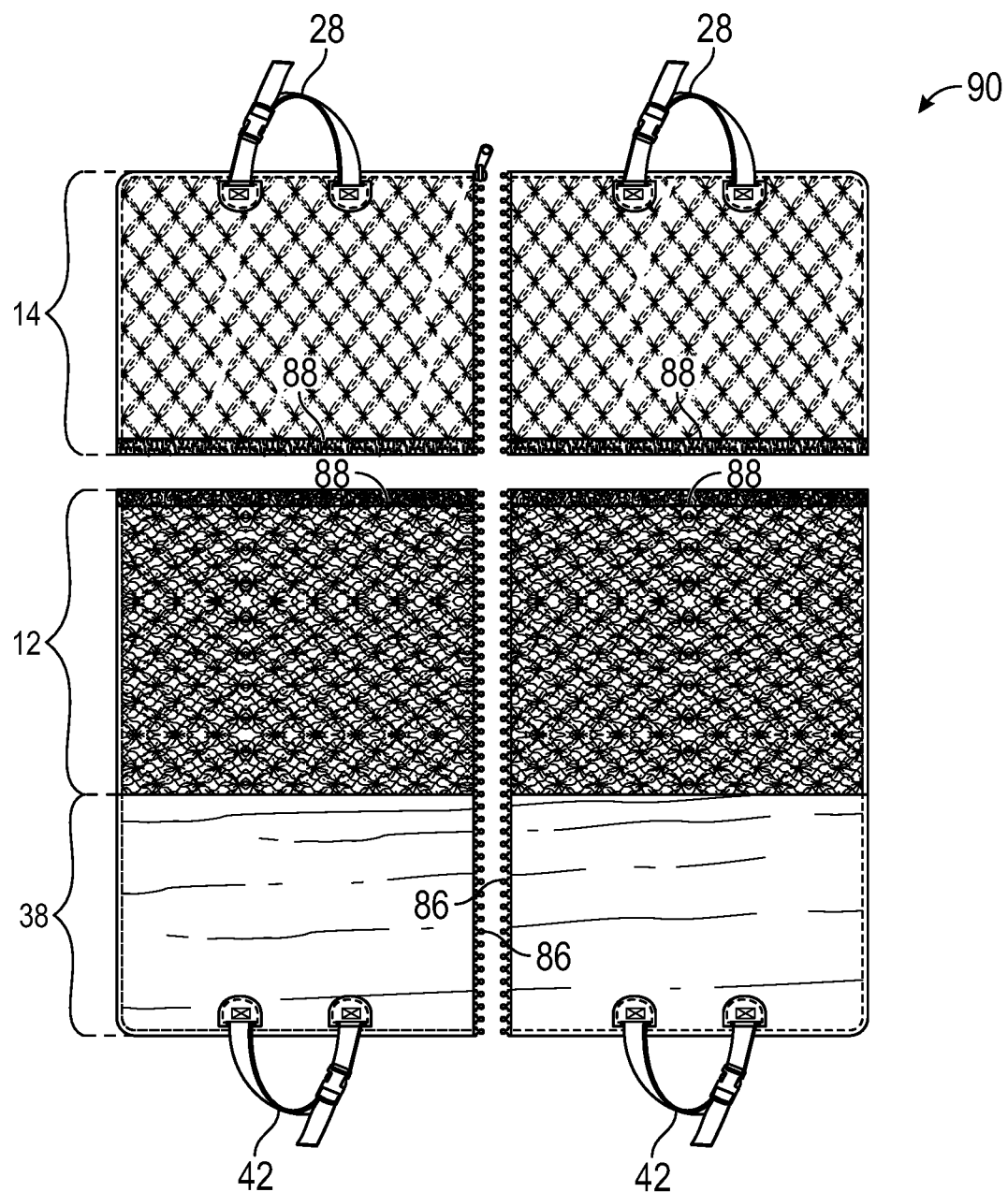
FIG. 8A is a top view of another example cover, illustrating the cover disassembled, according to some embodiments.
Figure 8B:
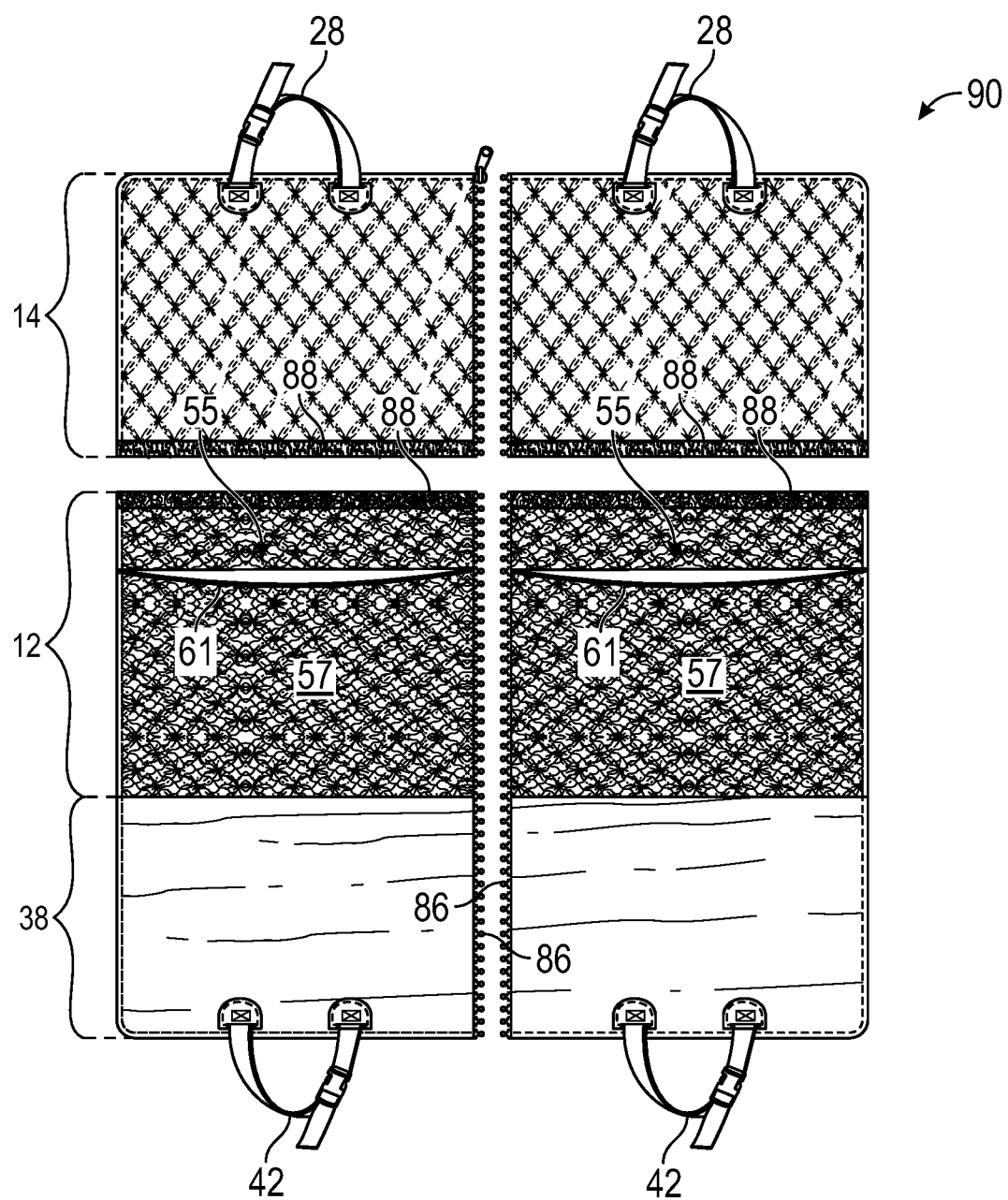
FIG. 8B is a bottom view of the cover of FIG. 8A, illustrating the cover disassembled, according to some embodiments.

In some embodiments, a particular slit 43 may divide the lower portion 12 such that the lower portion 12 includes a particular first section with a width approximately equal to a first percentage of an total width 84 (illustrated in FIGS. 1-3, for example) of the lower portion 12 and a particular second section with a width approximately equal to a second percentage of the total width 84 of the lower portion 12. For example, a particular slit 43 may divide the lower portion 12 such that the lower portion 12 includes a particular first section with a width approximately equal to 50% of an total width 84 of the lower portion 12 and a particular second section with a width approximately equal to 50% of the total width 84 of the lower portion 12, as illustrated in FIGS. 8A-8B, for example. As another example, a particular slit 43 may divide the lower portion 12 such that the lower portion 12 includes a particular first section with a width approximately equal to 60% of an total width 84 of the lower portion 12 and a particular second section with a width approximately equal to 40% of the total width 84 of the lower portion 12. As yet another example, a particular slit 43 may divide the lower portion 12 such that the lower portion 12 includes a particular first section with a width approximately equal to 70% of an total width 84 of the lower portion 12 and a particular second section with a width approximately equal to 30% of the total width 84 of the lower portion 12.

In some embodiments, a particular first slit 43 and a particular second slit 43 may divide the lower portion 12 such that the lower portion 12 includes a particular first section with a width approximately equal to a first percentage of an total width 84 of the lower portion 12, a particular second section with a width approximately equal to a second percentage of the total width 84 of the lower portion 12, and a particular third section with a width approximately equal to a third percentage of the total width 84 of the lower portion 12. For example, a particular first slit 43 and a particular second slit 43 may divide the lower portion 12 such that the lower portion 12 includes a particular first section with a width approximately equal to 40% of an total width 84 of the lower portion 12, a particular second section with a width approximately equal to 20% of the total width 84 of the lower portion 12, and a particular third section with a width approximately equal to 40% of the total width 84 of the lower portion 12. In some embodiments, the particular second section may be disposed between the particular first and third sections of the lower portion 12.

Figure 9A:
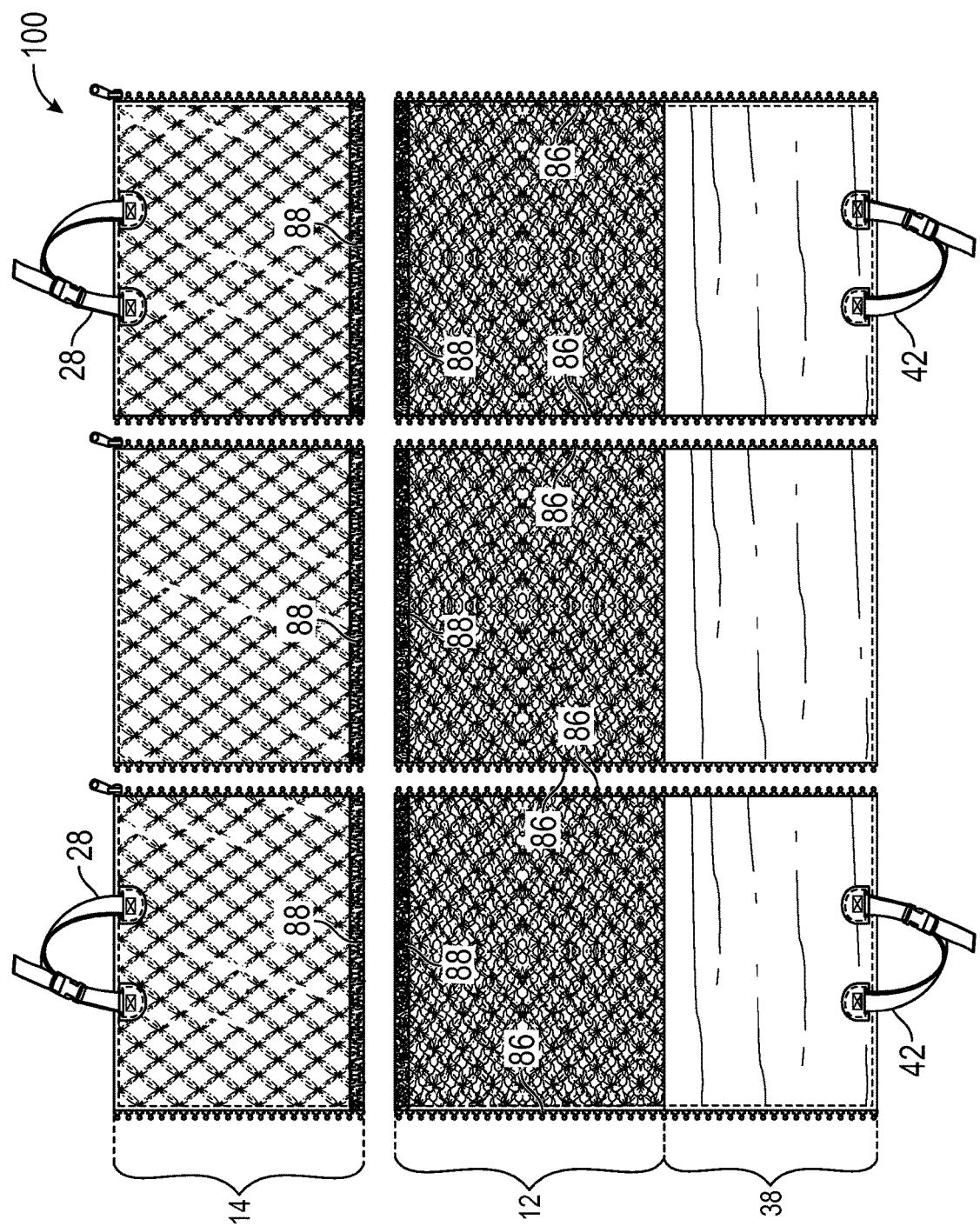
FIG. 9A is a top view of another example cover, illustrating the cover disassembled, according to some embodiments.
Figure 9B:
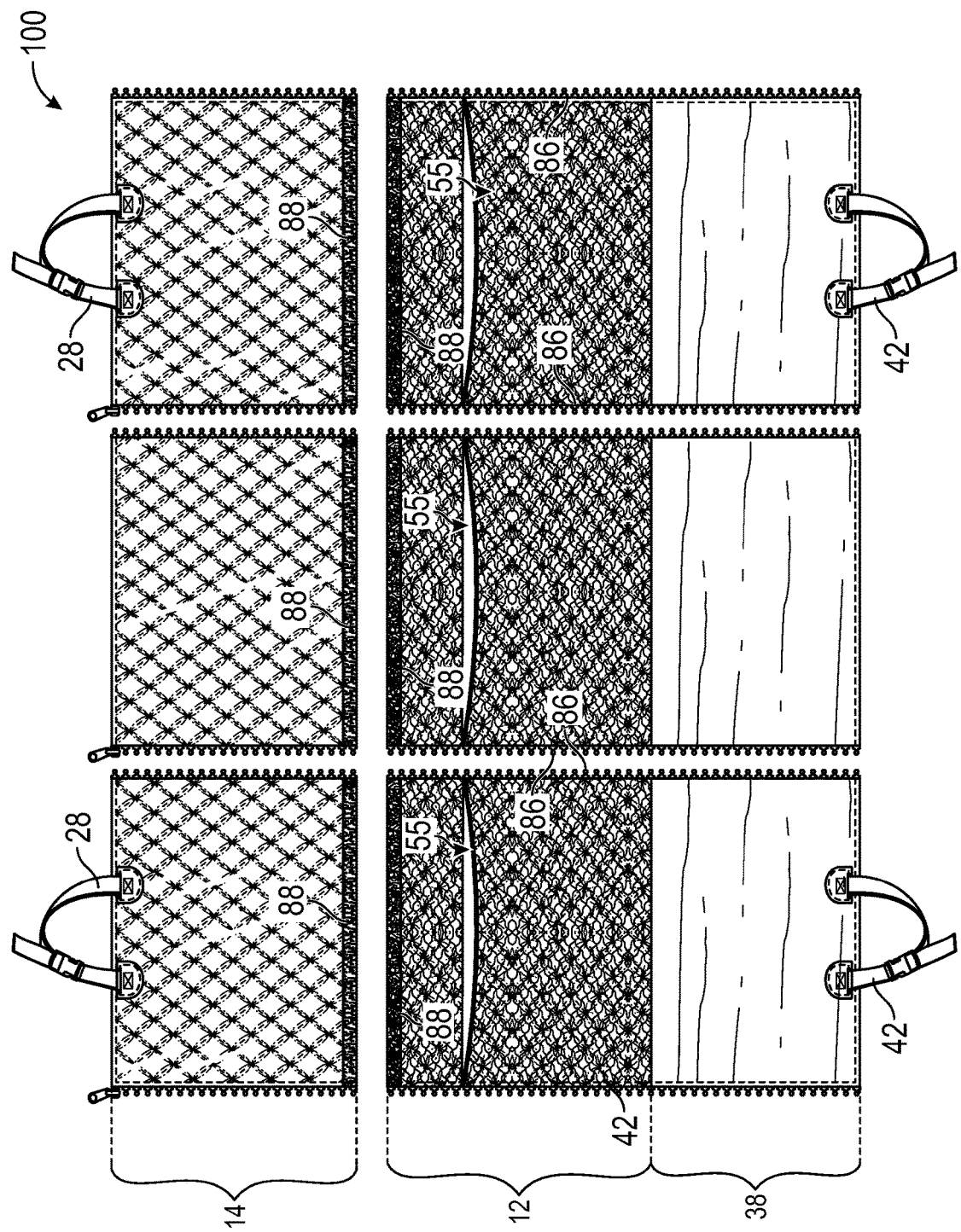
FIG. 9B is a bottom view of the cover of FIG. 9A, illustrating the cover disassembled, according to some embodiments.
Figure 9C:
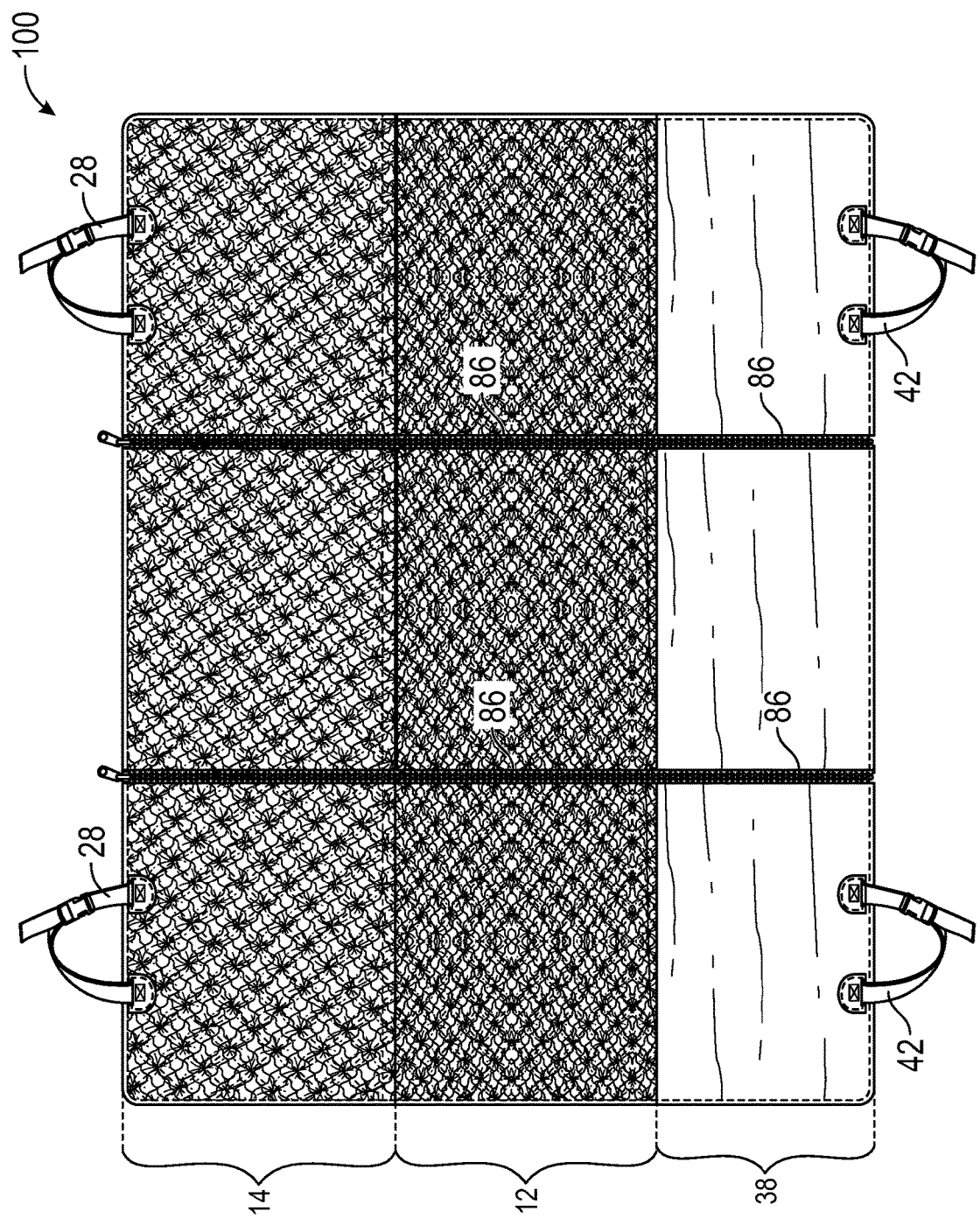
FIG. 9C is a top view of the cover of FIG. 9A, according to some embodiments.

As another example, as illustrated in FIGS. 9A-9C, a particular first slit 43 and a particular second slit 43 may divide the lower portion 12 such that the lower portion 12 includes a particular first section with a width approximately equal to one third of an total width 84 of the lower portion 12, a particular second section with a width approximately equal to one third of the total width 84 of the lower portion 12, and a particular third section with a width approximately equal to one third of the total width 84 of the lower portion 12. In some embodiments, the particular second section may be disposed between the particular first and third sections of the lower portion 12.

Figure 8C:
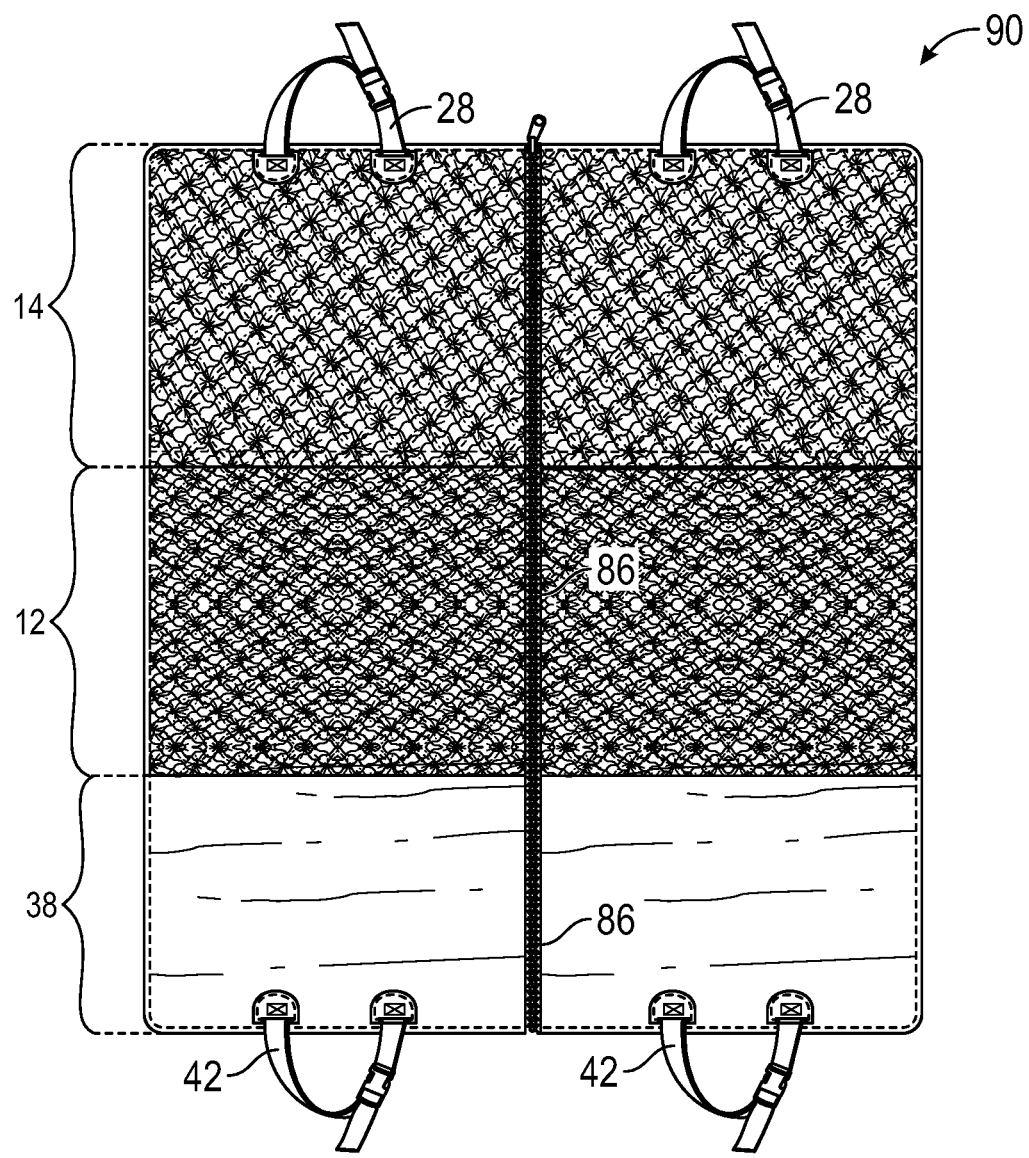
FIG. 8C is a top view of the cover of FIG. 8A, according to some embodiments.

Referring now to FIGS. 8-9, in some embodiments, the lower portion 12 may include multiple sections. In some embodiments, the multiple sections of the lower portion 12 may be coupled to one or more sections of the upper portion 14 via one or more other coupling mechanisms 88, which may include any suitable coupling mechanism, such as for example, buttons, snaps, magnets, clasps, eyelets, hooks, zippers, etc. In some embodiments, the coupling mechanisms 88 may include a hook and loop fastener, such as VELCRO™, as illustrated, for example, in FIGS. 8-9. In some embodiments, the coupling mechanisms 88 may extend along at least a portion of a border between the lower portion 12 and the upper portion 14. In some embodiments, the coupling mechanisms 88 may be disposed on the underside and/or the top of the cover 10. In some embodiments, the coupling mechanisms 88 may facilitate selective coupling between one or more sections of the upper portion 14 and one or more sections of the lower portion 12. In some embodiments, an example cover 90 and an example cover 100 illustrated in FIGS. 8 and 9, respectively, may correspond to the cover 10, illustrated in FIGS. 1-7.

In some embodiments, a kit may include multiple sections that may be coupled together to form the lower portion 12. In some embodiments, the multiple sections that may be coupled together to form the lower portion 12 may have different sizes or widths, and a user may couple any of the multiple sections together based on the particular seat configuration and dimensions of the vehicle of the user. For example, the kit may include a combination of sections of FIGS. 8 and 9 to form the lower portion 12. In some embodiments, as illustrated, for example, in FIGS. 9A-9C, both outer edges of one each of the multiple sections of the lower portion 12 may include the coupling mechanism 86 to facilitate coupling of any of the multiple sections of the lower portion 12 in any order to correspond to a particular seat configuration and dimensions of the vehicle.

In some embodiments, the kit may similarly include multiple sections that may be coupled together to form the upper portion 14. In some embodiments, the multiple sections of the upper portion 14 may have different sizes or widths. In some embodiments, the sections of the upper portion 14 may be coupled together via one or more coupling mechanisms, such as, for example, the first coupling mechanism 52 and/or the second coupling mechanisms 54.

Figure 9D:
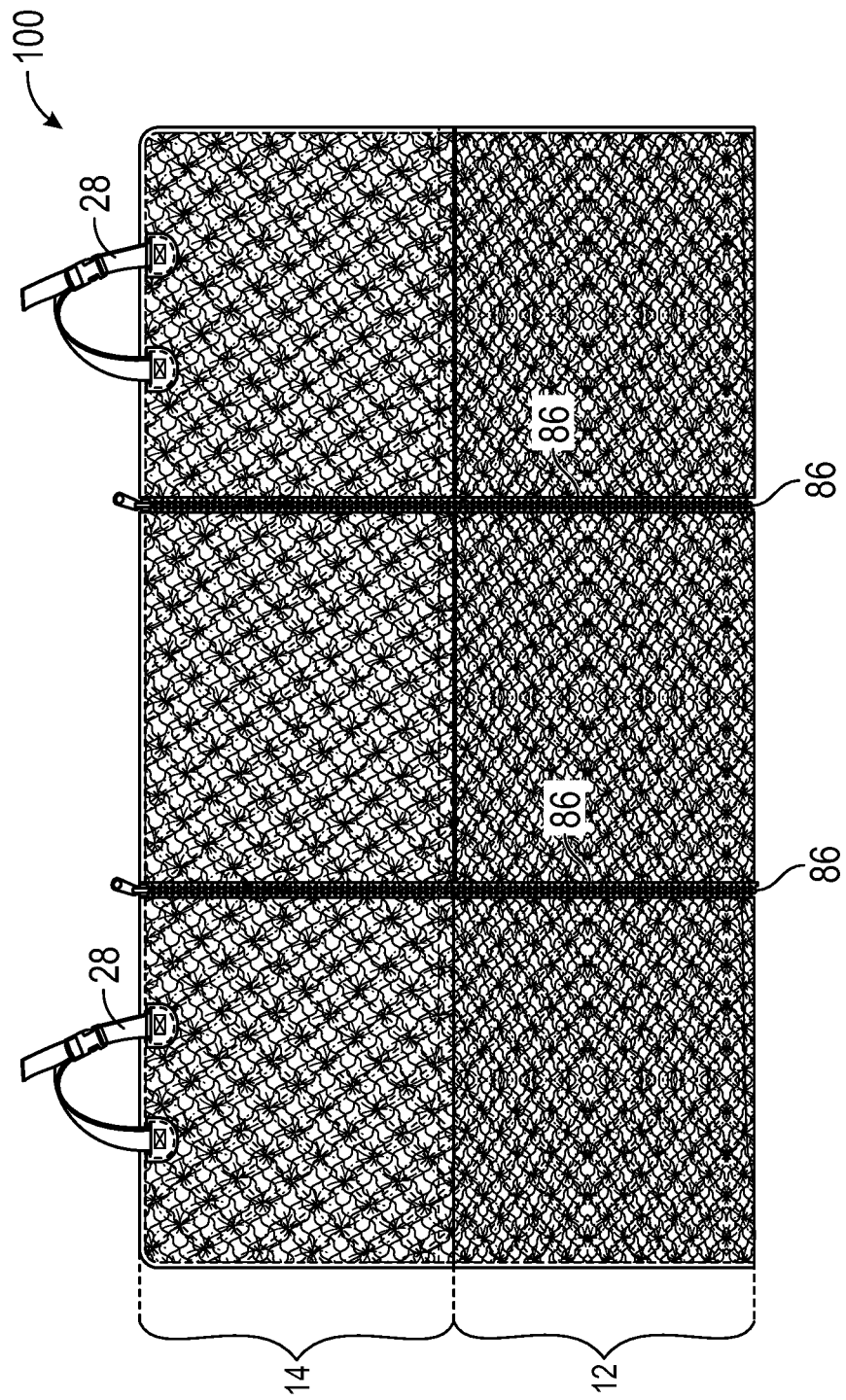
FIG. 9D is a top view of a cover comprising only upper and lower portions, according to come embodiments.

Referring now to FIG. 9D, in some embodiments cover 100 only comprises lower portion 12 and upper portion 14, wherein cover 100 is provided without guard portion 38. Further, in some embodiments cover 100 only comprises lower portion 12, wherein cover 100 is provided without upper portion 14 or guard portion 38. Further still, in some embodiments cover 100 comprises only lower portion 12 and guard portion 38, wherein cover 100 is provided without upper portion 14. Thus, cover 100 may be provided in a variety of configurations and setups within the scope and teaching of the present invention.

One of skill in the art will appreciate that the various features and elements of the various embodiments of the present invention may be modified and/or combined within the spirit of the present invention to provide a seat cover. For example, the size, dimensions, shapes, proportions and materials of the present invention may be modified as desired or necessary based on, for example, a vehicle configuration, shape, or dimensions. For example, quantity and/or placement of one or more slits in the upper portion 14 and/or the lower portion 12 may be varied. As another example, quantity and/or placement of one or more openings, such as the first opening 30, the second opening 32, the third opening 34, and/or the fourth opening 36 may be varied. In some embodiments, a particular cover, such as, for example, the cover 10, the cover 90, or the cover 100, may be configured to fit various vehicle interiors and seat configurations, as described in the present disclosure.

The present invention may be embodied in other specific forms without departing from its structures, methods, or other essential characteristics as broadly described herein and claimed hereinafter. Therefore, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A vehicle seat cover having a centerline and comprising:
   a bench portion adapted to extend over a bench portion of a vehicle seat, said bench portion consisting essentially of:
     a bench width having a first bench half and a second bench half, said first bench half defined by a first portion of the bench portion located between the centerline and a first bench side edge of the bench portion, said second bench half defined by a second portion of the bench portion located between the centerline and a second bench side edge of the bench portion, said second bench side edge being positioned opposite said first bench side edge, said first and second bench side edges being approximately parallel to the centerline;
     a bench front edge extending between the first bench side edge and the second bench side edge;
     a bench rear edge extending between the first bench side edge and the second bench side edge, said bench rear edge being positioned opposite said bench front edge, said bench front and bench rear edges being approximately perpendicular to the centerline; and
     a single slit positioned in the bench first half, said single slit having a closed end defined by a sub-portion of the first portion of the bench portion, said closed end being proximal to the bench rear edge, said single slit dividing the bench portion into a first flap having a first flap width, and a second flap having a second flap width, wherein the second flap width is greater than the first flap width; and
   a guard portion coupled to the bench front edge and consisting essentially of:
     a guard width having a first guard half and a second guard half, said first guard half defined by a first portion of the guard portion located between the centerline and a first guard side edge of the guard portion, said second guard half defined by a second portion of the guard portion located between the centerline and a second guard side edge of the guard portion, said second guard side edge being positioned opposite said first guard side edge, said first and second guard side edges being approximately parallel to the centerline; and
     a guard front edge opposite the bench front edge, wherein the single slit is further positioned in the first guard half, said single slit further having an open end opening out through the guard front edge, said single slit dividing the guard portion into a third flap having a third flap width and a fourth flap having a fourth flap width, wherein the fourth flap width is greater than the first flap width, wherein each of the first bench side edge, the second bench side edge, the first guard side edge, and the second guard side edge is a free-end edge; and
   the bench portion comprising a means for attaching the vehicle seat cover to the vehicle seat.

2. The cover of claim 1, wherein the third flap width is approximately equal to the first flap width, and wherein the fourth flap width is approximately equal to the second flap width.

3. The cover of claim 1, wherein the means for attaching comprises an anchor.

4. The cover of claim 1, wherein the means for attaching comprises a strap.

5. The cover of claim 1, wherein the means for attaching comprises a pocket.

6. The cover of claim 1, wherein the means for attaching comprises a loop.

7. The cover of claim 1, wherein the means for attaching is positioned on the bench rear edge.

8. The cover of claim 1, wherein the means for attaching is positioned on the first bench side edge.

9. The cover of claim 1, wherein the means for attaching is positioned on the second bench side edge.

10. A method for covering a bench of a vehicle seat and a footwell of a vehicle, comprising:
providing a vehicle seat cover having a centerline and comprising:
a bench portion adapted to extend over a bench of a vehicle seat, said bench portion consisting essentially of:
a bench width having a first bench half and a second bench half, said first bench half located between the centerline and a first bench side edge of the bench portion, said second bench half located between the centerline and a second bench side edge of the bench portion, said second bench side edge being positioned opposite said first bench side edge, said first and second bench side edges being approximately parallel to the centerline;
a bench front edge extending between the first bench side edge and the second bench side edge;
a bench rear edge extending between the first bench side edge and the second bench side edge, said bench rear edge being positioned opposite said bench front edge, said bench front and bench rear edges being approximately perpendicular to the centerline; and
a single slit positioned in the bench first half, said single slit having a closed end defined by a sub-portion of the first bench half of the bench portion, said closed end being proximal to the bench rear edge, said single slit dividing the bench portion into a first flap having a first flap width, and a second flap having a second flap width, wherein the second flap width is greater than the first flap width;
a guard portion coupled to the bench front edge and consisting essentially of:
a guard width having a first guard half and a second guard half, said first guard half located between the centerline and a first guard side edge of the guard portion, said second guard half located between the centerline and a second guard side edge of the guard portion, said second guard side edge being positioned opposite said first guard side edge, said first and second guard side edges being approximately parallel to the centerline; and
a guard front edge opposite the bench front edge, wherein the single slit is further positioned in the first guard half, said single slit further having an open end opening out through the guard front edge, said single slit dividing the guard portion into a third flap having a third flap width and a fourth flap having a fourth flap width, wherein the fourth flap width is greater than the first flap width, wherein each of the first bench side edge, the second bench side edge, the first guard side edge, and the second guard side edge is a free-end edge; and
the bench portion comprising a means for attaching the vehicle seat cover to the vehicle seat; and
securing the cover to a bench portion of a vehicle seat.

11. The method of claim 10, further comprising aligning the single slit with a partition of a bench portion of a vehicle seat, wherein the partition divides a first articulable section of the bench portion of the vehicle seat from a second articulable section of the bench portion of the vehicle seat.

12. The method of claim 11, wherein the first articulable section is wider than the second articulable section.

13. The method of claim 10, wherein the guard portion is selectively coupled to the bench front edge.

14. The method of claim 10, further comprising a step for attaching a coupling mechanism to the single slit, wherein the coupling mechanism is configured to selectively couple the first flap to the second flap, and selectively couple the third flap to the fourth flap.

15. The method of claim 14, wherein the coupling mechanism is a zipper.

16. A vehicle seat cover, comprising:
a horizontal portion adapted to extend over a horizontal portion of a vehicle seat, the horizontal portion consisting essentially of:
a horizontal width having a first horizontal half and a second horizontal half, the first horizontal half extending from a first horizontal side edge to a centerline, the second horizontal half extending from the centerline to a second horizontal side edge, the first horizontal side edge opposite the second horizontal side edge, the first horizontal side edge and the second horizontal side edge approximately parallel to the centerline;
a horizontal front edge extending from the first horizontal side edge to the second horizontal side edge;
a horizontal rear edge extending from the first horizontal side edge to the second horizontal side edge; the horizontal rear edge opposite the horizontal front edge, the horizontal front edge and the horizontal rear edge approximately perpendicular to the centerline;
a single slit positioned in the first horizontal half, said single slit having a closed end defined by a sub-portion of the first horizontal half, said closed end proximal to the horizontal rear edge, the slit dividing the horizontal portion into a first flap having a first flap width, and a second flap having a second flap width, wherein the second flap width is greater than the first flap width; and
a skirt portion coupled to the front edge of the horizontal portion, the skirt portion consisting essentially of:
a skirt width having a first skirt half and a second skirt half, wherein the centerline is further positioned in the skirt, the first skirt half extending from a first skirt side edge to the centerline, the second skirt half extending from the centerline to a second skirt side edge, the first skirt side edge opposite the second skirt side edge, the first skirt side edge and the second skirt side edge approximately parallel to the centerline; and
a skirt front edge opposite the horizontal front edge, wherein the slit is further positioned in the first skirt half, the slit further comprising an open end on the skirt front edge, the slit dividing the guard portion into a third flap having a third flap width and a fourth flap having a fourth flap width, wherein the fourth flap width is greater than the first flap width, wherein each of the first horizontal side edge, the second horizontal side edge, the first skirt side edge, and the second skirt side edge are a free-end edge; and the horizontal portion comprising a means for attaching the vehicle seat cover to the vehicle seat.

* * * * *